INVENTORS
Walter E. Heyer
Harold E. Mescher
Attorney

INVENTORS
Walter E. Heyer
Harold E. Mescher
BY
Attorney

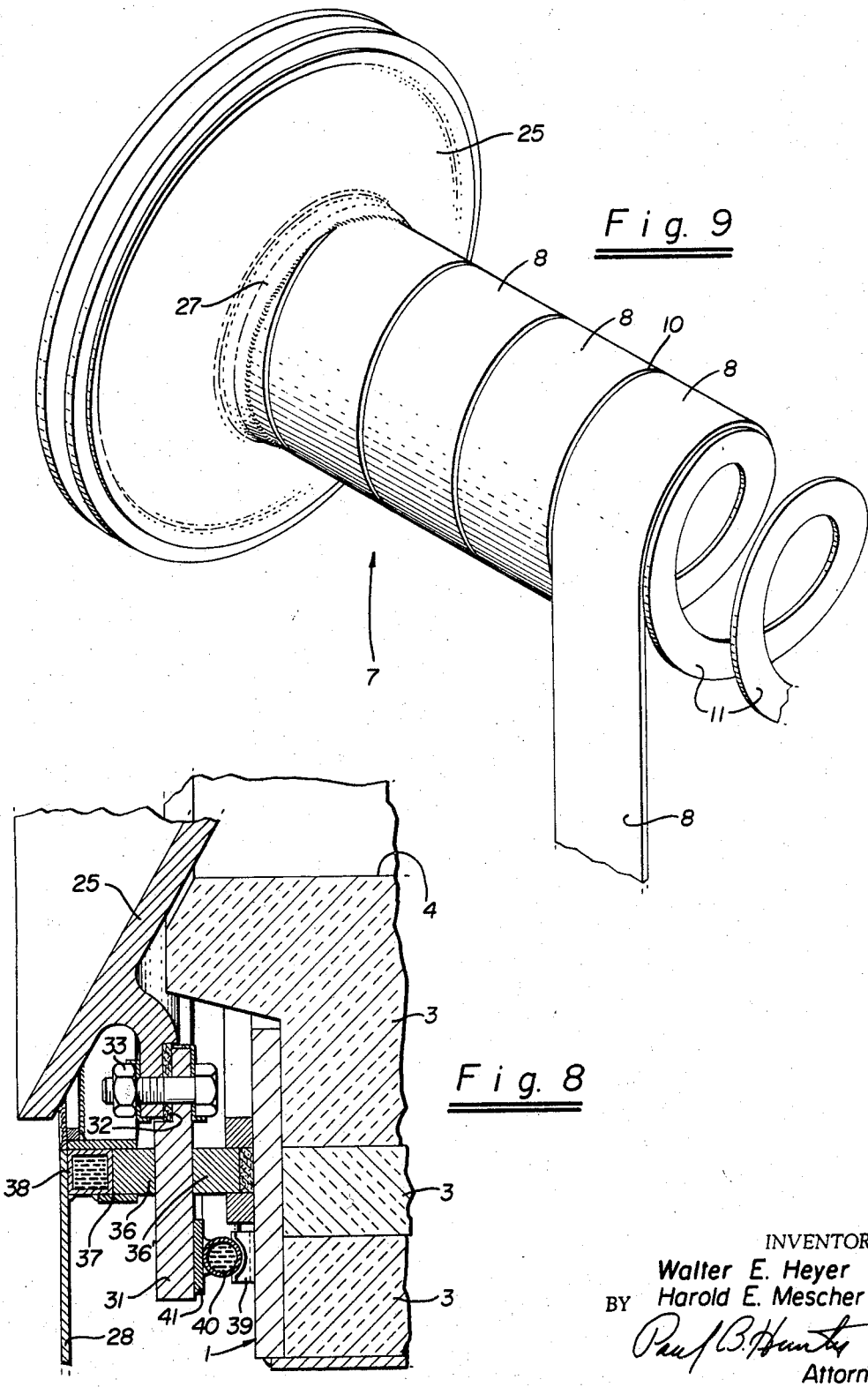

United States Patent Office 3,441,259
Patented Apr. 29, 1969

3,441,259
HEAT TREATING FURNACE
Walter E. Heyer, Los Alamitos, and Harold E. Mescher, Pico Rivera, Calif., assignors to Pacific Scientific Company, City of Commerce, Calif., a corporation of California
Filed Sept. 1, 1967, Ser. No. 665,044
Int. Cl. F27b 7/14
U.S. Cl. 263—34                                6 Claims

ABSTRACT OF THE DISCLOSURE

A heat treating furance having a cylindrical retort comprised of a flat strip wound in helical shape with the adjacent convolutions slightly spaced to provide a helical recess for receiving a welding strip for welding a relatively deep internal helix to the helical strip, the welding strip being confined within the recess and presenting a neat, smooth inner surface within the retort so that articles will not cling to the same.

---

This invention relates generally to heat treating furnaces, and the invention has reference, more particularly, to a novel rotary retort heat treating furnace of the type disclosed in our U.S. Patent No. 3,272,489 which is especially adapted for controlled atmosphere and continuous processing of parts such as small and odd-shaped pieces including nuts, bolts, screws, rivets, pins, balls, springs, clips, chainsaw teeth, etc., which parts are difficult to treat otherwise and which usually require relatively long retention times at desired temperatures as in cases of carburizing, carbonitriding and carbon restoration, hardening and drawing.

Prior art furnaces generally employ heavy walled rough cast retorts with internal cast spirals for conveying the work through the rotating retorts. The irregular shaped small pieces tend to catch and cling to these rough castings, ride up in the retort and fall back, resulting in delays in passing through the furnace, so that uniform treatment of all parts is impossible, resulting in poor work, overheating, or uneven heat treatment results. Since the discharge chutes of such prior art furnaces generally permit air to enter therethrough and hence into the furnace, uniformity of furnace atmosphere was impossible, resulting in rapid deterioration of heater elements and of the retort spirals.

In our aforementioned patent, many of these deficiencies of the prior art furnaces were overcome by use of a retort having a relatively thin smooth inner removable lining preferably of wrought temeperature-resistant alloy that is formed with a smooth inwardly pressed hollow helix for moving the work along within the furnace without the work catching on the surfaces of the helix. However, it is difficult to press the helix deep enough for handling larger pieces of work or when the work is fed through the furnace in large volume.

It is an object of the present invention to provide a novel improved rotary retort furnace capable of handling all practical sizes of work and in large volume, when desired, by employing a greater depth of internal helix in the retort and wherein the work does not cling to the walls of the helix due to the unique smoothly formed structure of the retort so that the work passes therethrough uniformly in use.

Another object of the present invention is to provide a novel heat treating furnace of the above character having a sealed discharge opening and embodying novel sealing means for sealing the joint between the frusto-conical apron of the discharge end of the rotary retort and the furnace casing and the joint between the conical discharge end plug of the furnace and frusto-conical apron of the retort, said sealing means incorporating cooling means for cooling the frusto-conical apron and the sealing gaskets.

Still another object of the present invention is to provide a novel and compact drive for the furnace retort located at the forward and relatively cool end portion of the furnace.

Other objects and advantages of this invention will become apparent after a perusal of the following specification taken in connection with the accompanying drawings wherein:

FIG. 6 is an enlarged fragmentary view taken at 6—6 of FIG. 1 and showing the clean joint structure between the rotor casing and helix;

FIG. 7 is an enlarged sectional view taken along 7—7 of FIG. 1 showing a welded guide rib on the retort discharge apron;

FIG. 8 is an enlarged sectional view taken along 8—8 of FIG. 1 showing the novel sealing and cooling means of this invention;

FIG. 9 is a perspective view showing a manner of producing the novel retort.

Similar characters of reference are used in the above figures to designate corresponding parts.

Figure 1:
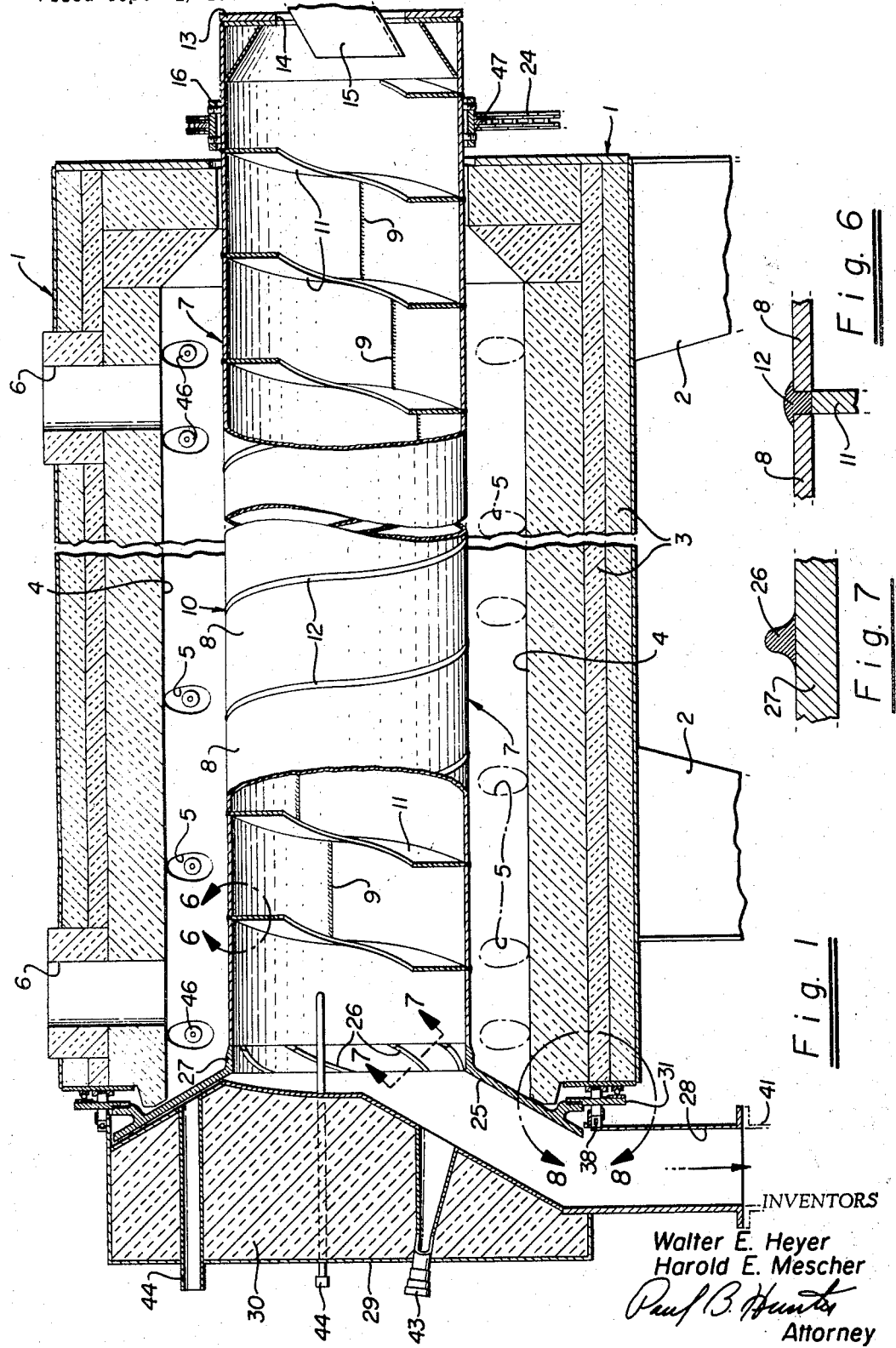
FIG. 1 is a side view with parts broken away of the novel furnace of this invention.
Figures 2, 3:
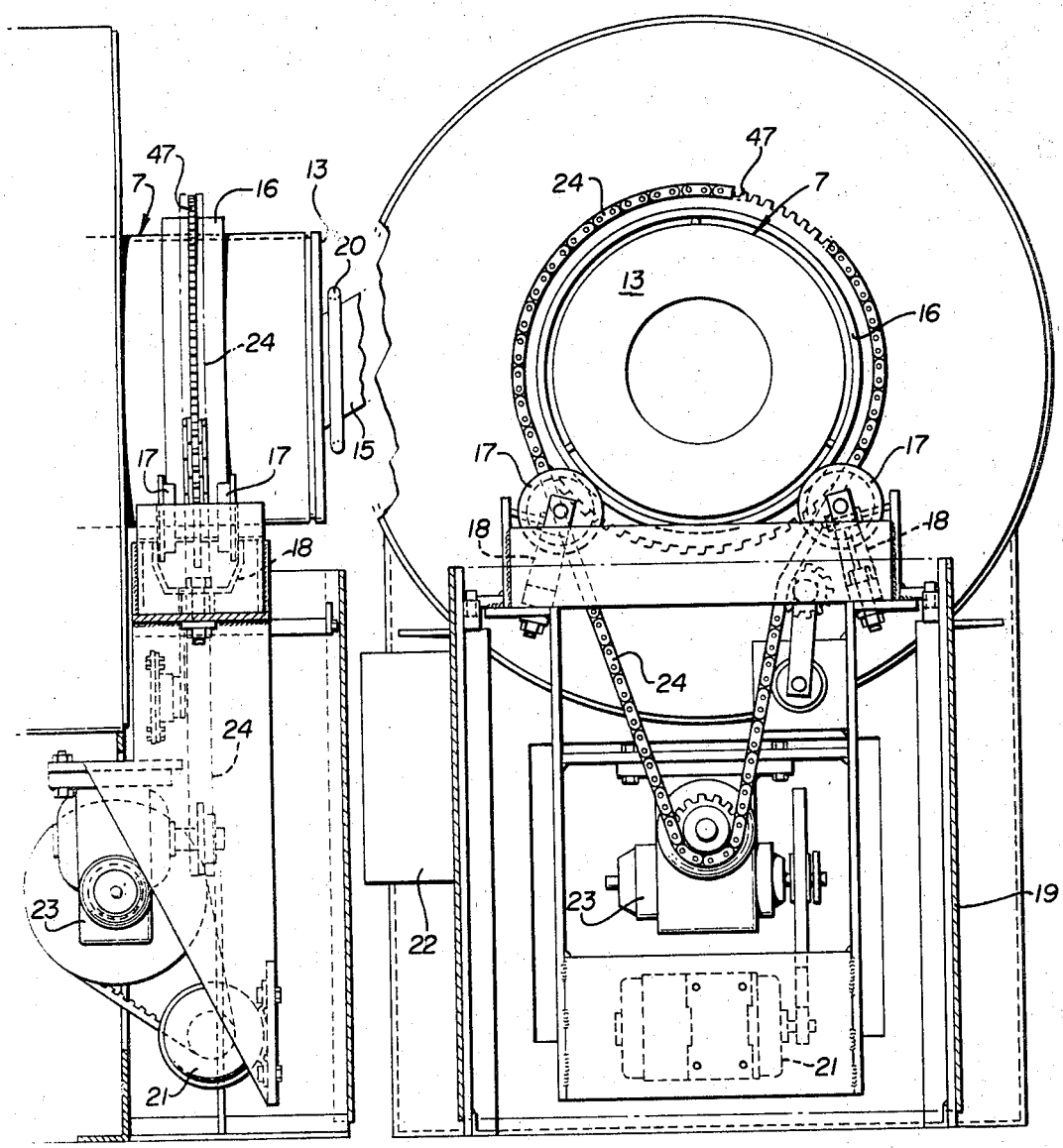
FIG. 2 is a fragmentary view showing the front end portion of the furnace of FIG. 1 and the retort driving mechanism.
FIG. 3 is a view looking at the front of FIG. 2.
Figure 4:
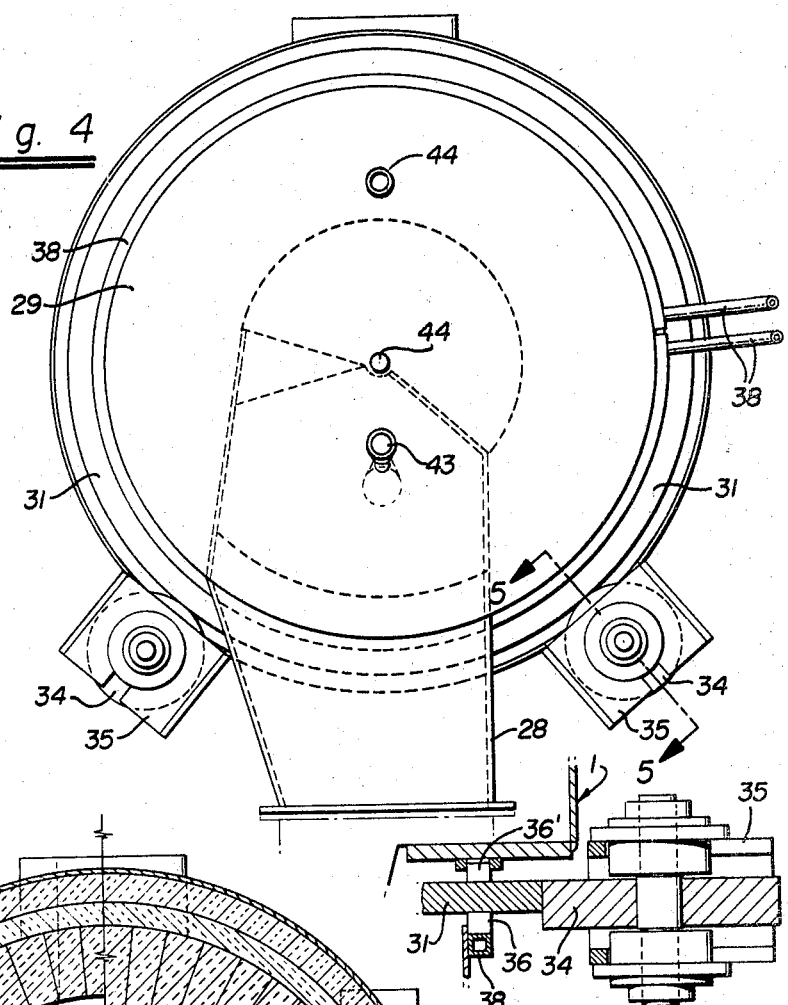
FIG. 4 is a fragmentary view looking at the rear end of the furnace.

Referring now to the drawings, the reference numeral 1 designates the furnace housing which is preferably of sheet metal and is shown supported on legs 2. Insulation 3 is contained within the housing 1 and has a hollow cylindrical interior to provide a furnace heating chamber 4 around the periphery of which are located burner openings 5 for receiving suitable heater elements such as gas-fired burners 46, or open electric heater elements may be used, if desired. Exhaust flues 6 are provided where open gas firing is used.

Extending axially within the cylindrical heating chamber 4 is a rotatable furnace retort 7 comprising a casing made up of a helically wound smooth flat strip 8 preferably of wrought temperature-resistant alloy. Each convolution of the strip 8 may be made up of a separate sheet of metal welded transversely as at 9 (see FIG. 1), or this strip may be continuous as shown in FIG. 9. The strip 8 thus forms the cylindrical body of the retort 7, and the consecutive convolutions of the strip 8 are slightly spaced as shown at 10 conforming substantially to the thickness of an internal helical work propelling web 11, the peripheral edges of this web abutting the inner edges of consecutive convolutions of the strip 8 as shown in FIG. 6. The web 11 is relatively deep so that work as it progresses through the retort will not fall over the inner edges of this web and thus fail to pass along at the desired speed. In a typical case where the internal diameter of the retort 7 is 18″, the depth of the web 11 could be 5″.

The opposing edges of successive convolutions of the strip 8 together with the peripheral edge portion of web 11 provide a continuous helical confined space or helical recess within which the weld 12 is applied and confined to retain the parts 8 and 11 in assembled relation. The weld 12 is preferably made in a continuous automatic process using heliarc in the presence of an inert gas such as argon, thereby obtaining a clean weld with no roughness on the inner surfaces of strip 8 where it joins the web 11, as best shown in FIG. 6.

Since the interior surfaces of the helical strip 8 and the surfaces of web 11 after welding are smooth, the helical weld 12 holding these members together being confined between the edge portions of these members, there is no tendency for the work to ride up the side wall of the retort in use and fall back into an adjoining successive convolution of the retort, thus preventing over treating of the work and excessive carburization, or grain growth, neither of which can be tolerated.

The forward end of retort 7 is covered by a cylindrical end plate 13 that is sealed to the end of the helical strip 8 and is closed except for a central opening 14 into which a vibrating tray 15 is shown extending for advancing the work into the furnace. The opening 14 is preferably protected by a curtain burner 20 and is kept as small as possible and still accommodate the work so as to limit any chance of air infiltration. A slight amount of infiltration is not detrimental at this charge or forward end of the retort 7 since the parts or work are not yet up to temperature and the flow pattern of the atmosphere within the retort is toward this forward or charged end and exiting out the charging opening 14.

The forward end portion of the retort 7 has an annular bearing collar 16 fixed thereon, and this collar is supported by two pairs of rollers 17 positioned on opposite sides of the retort 7, said rollers being carried by brackets 18 fixed on a frame 19. Frame 19 also carried a drive motor 21 which, acting through reduction gearing 23 and sprocket chain 24, drives a sprocket 47 fixed on collar 16 to rotate the retort 7 in use. Motor 21 is preferably a variable speed, reversible direct-current electric motor controlled from a control panel 22 which may be the electrodyne type and will serve to either drive the spiral web 11 forwardly so that the work moves toward the rear of the furnace at any of a pluality of speeds depending on the nature of the work and the depth of the case desired, or, if desired, the motor can be oscillated, i.e., reversed periodically with somewhat larger forward drive than rearward drive as where long soak periods are desired. By driving the retort in this manner from the front and relatively cool end of the furnace there is far less chain wear than when the drive is at the rear hot end as in our prior patent. Also, since the front end of the retort 7 is considerably smaller in diameter than the rear discharge end, a shorter drive chain can be used.

The rear end of the retort 7 is provided with a frustoconical discharge apron 25 secured in gas tight relation to the retort 7 to enable easy discharge of the work from the retort. Fragmentary mutually spaced helical ribs 26 welded on the inner surface of a cylindrical inner flange 27 of apron 25 serve to aid in discharging the work from the retort and into the discharge chute 28 provided in a substantially conical plug 29 that covers the discharge end of the retort in sealing relation. The plug 29 is removably supported on the furnace housing, has a sheet metal casing of heat-resistant alloy, and is filled with insulation 30. Chute 28 has an extension 41 that projects downwardly into the cooling fluid in a quench tank (not shown), thereby sealing off this chute in the manner shown in our aforementioned patent.

Figure 5:
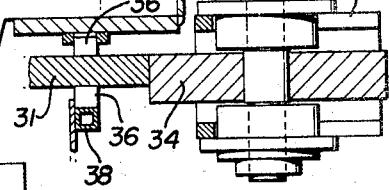
FIG. 5 is an enlarged detail view taken along 5—5 of FIG. 4 showing a front rotor end support roller.
Figure 10:
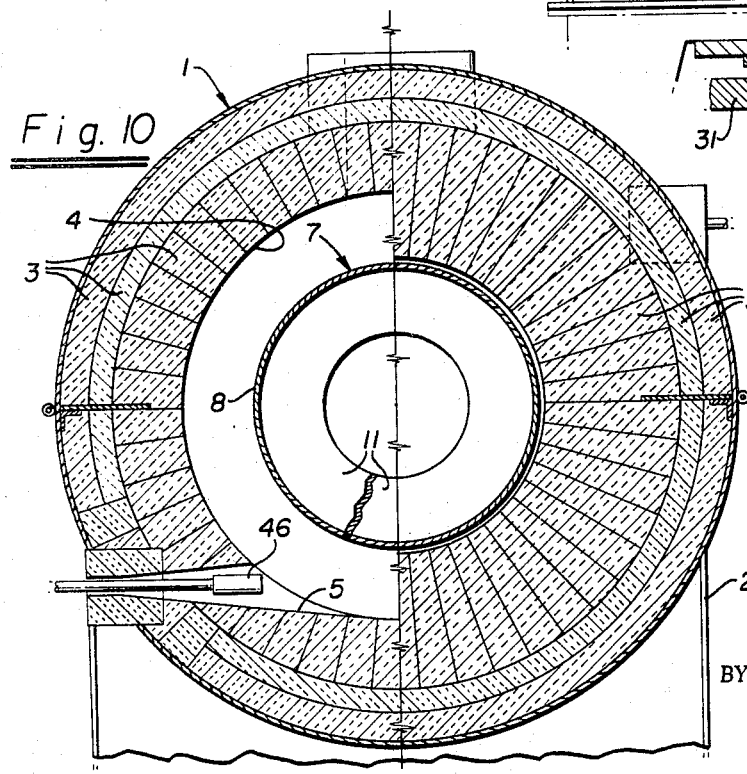
FIG. 10 shows a transverse cross-sectional view of the furnace with parts broken away.

The periphery of the apron 25 has a ring member 31 secured thereto as by bolts 33 (see FIG. 8). Asbestos ring insulation 32 is shown interposed between apron 25 and ring member 31 so as to restrict the flow of heat from the hot apron 25 to ring member 31 in use. The ring member 31 and hence the rear end of retort 7 is rotatably supported by rollers 34 (see FIG. 5) rotatably carried by brackets 35 fixed on the furnace housing.

Annular graphite impregnated asbestos packing seals 36, 36' engage opposite sides of the ring member 31 (see FIG. 8) to respectively seal off the retort 7 and the heating chamber 4 from the outside atmosphere. Seal 36 is carried by an annular bracket 37 attached to the conical plug 29, and this seal is cooled by circulating water flowing in a cooling pipe 38 also carried by bracket 37. The cooling of the seal 36 prevents injury thereto from the rotating hot ring member 31 in use. Seal 36' is carried by the furnace housing 1 and this housing also carries leaf spring members 39 which urge a cooling pipe 40 and connected plates 41 against the side of rotating ring member 31 so as to protect seal 36' from injury in use. Thus, it will be seen that the ring insulation 32 in combination with cooling pipes 38 and 40 on opposite sides of ring member 31 all act to keep the temperature of this member within reasonable limits to protect the seals 36 and 36', whereby they have a long life in use.

A peepsight 43 passing through plug 30 permits viewing of the work as it drops from the retort into the quench tank to assure proper operation. A thermocouple 44 is shown extending through the plug 30 in sealed relation thereto and projects into the retort 7 for accurately determining the temperature of the parts as they pass onto apron 25 and into duct 28, as the temperature of the work as it enters the quench is very critical and must be monitored. The gas atmosphere inlet 44 is also shown extending through the plug 30.

In use, the parts to be treated and fed into the furnace retort 7 through tray 15 are carried through the retort by the stem of the helix 11. The height of this helix is sufficient to move all of the work along together and without any work on top slipping back over the helix. Tumbling action is achieved by the rotation of the retort 7 and in so doing all surfaces of the parts are exposed to the atmosphere present in the retort. If greater tumbling action is required than can be achieved by a single direction of travel under conditions of long soak periods wherein the retort would be turning slowly, the drive motor 21 may be oscillated by proper setting of control panel 22 with slightly longer forward drive times to increase the tumbling at the same actual retort retention time. Owing to the smooth surfaces of the retort strip 8 and helical web 11 and to the clean joints between these members, parts cannot cling to these members and ride up high enough to drop back into an adjoining convolution of the web 11. The parts leaving the retort 7 via apron 25 assisted by ribs 26 drop through duct 28 into the oil bath below. It will be noted that the long life cooled seals 36 and 36', acting in conjunction with the liquid seal in the quench tank, serve to prevent ingress of outside atmosphere into the retort 7 and chamber 4, whereby uniform heat treating and/or case hardening results.

Since many changes could be made in the above construction of the novel furnace of this invention and many apparently different embodiments of this invention could be made without departing from the scope thereof, it is intended that all matter contained in the above description or shown in the accompanying drawings shall be interpreted as illustrative and not in a limiting sense.

What is claimed is:
1. A heat treating furnace comprising a furnace housing having a heating chamber therewithin, means for heating said chamber, a rotatable retort within said heating chamber and supported at its ends exteriorly of said chamber, said retort having a cylindrical outer wall comprising a series of aligned consecutive convolutions of flat strip material wound into helical shape, the joints between successive helical convolutions of said strip being slightly spaced to provide a continuous helical welding recess, an inner helical work conveying web having a pitch equal to that of such welding recess, said web having its outer edge portion mating with consecutive convolutions of said strip at the bottom of the welding recess, and a continuous strip of welding material within said recess for securing said web and said consecutive convolutions of said strip together to form said retort, said welding material being confined wholly within the welding recess, whereby the inner surface of said strip and the surface of said web are smooth after welding with sharp clean joints therebetween.

2. A heat treating furnace as defined in claim 1 wherein said retort has a central opening at its forward end for receiving work and has a frusto-conical discharge apron at its rear end for facilitating the easy discharge of work from the retort, said helical work conveying web serving to move the work along the retort toward its rear discharge end while tumbling the same, the smooth contours of said web and that of its juncture with the cylindrical outer wall of said retort preventing the work from catching thereon in use and being delayed in passage through the retort.

3. A heat treating furnace as defined in claim 2 comprising a driven sprocket fixed upon the relatively cool forward end portion of said retort exteriorly of said furnace housing, a chain for driving said sprocket, and a reversible, variable speed motor connected for driving said sprocket chain for rotating said retort to feed the work therethrough.

4. A heat treating furnace as defined in claim 2 wherein said frusto-conical discharge apron is provided with mutually spaced helical bosses for aiding in discharging the work from said retort, a ring member mounted on the peripheral portion of said discharge apron, insulation included in the juncture between said ring member and said discharge apron, and rollers carried by said furnace housing and engaging said ring member for rotatably supporting the discharge end of said retort.

5. A heat treating furnace as defined in claim 4 wherein a rear substantially conical plug is removably carried by said furnace housing in projects into the flared discharge apron at the rear end of said retort, an annular bracket carried by said plug, a packing seal carried by said bracket and engaging one side of said ring member for preventing the escape of retort atmosphere, and a pipe containing cooling fluid also carried by said bracket and contacting said seal to protect the same from the heat of said ring member.

6. A heat treating furnace as defined in claim 5 wherein an annular packing seal is carried by said furnace housing and engages the other side of said ring member for preventing the escape of furnace gases from said heating chamber, fluid cooled plates engaging said other side of said ring member, and spring members positioned for pressing said cooled plates against said ring member to cool the same and protect said anular packing from injury.

References Cited

UNITED STATES PATENTS 3,176,970    4/1965    Holcroft _____ 263—34

JOHN J. CAMBY, *Primary Examiner.*

U.S. Cl. X.R.

29—428